Feb. 19, 1924.　　　　　　　　　　　　　　　　　　　1,483,938
G. E. HOLMES ET AL.
MEASURING ICE CREAM DISHER
Filed Nov. 13, 1922　　　　3 Sheets-Sheet 3

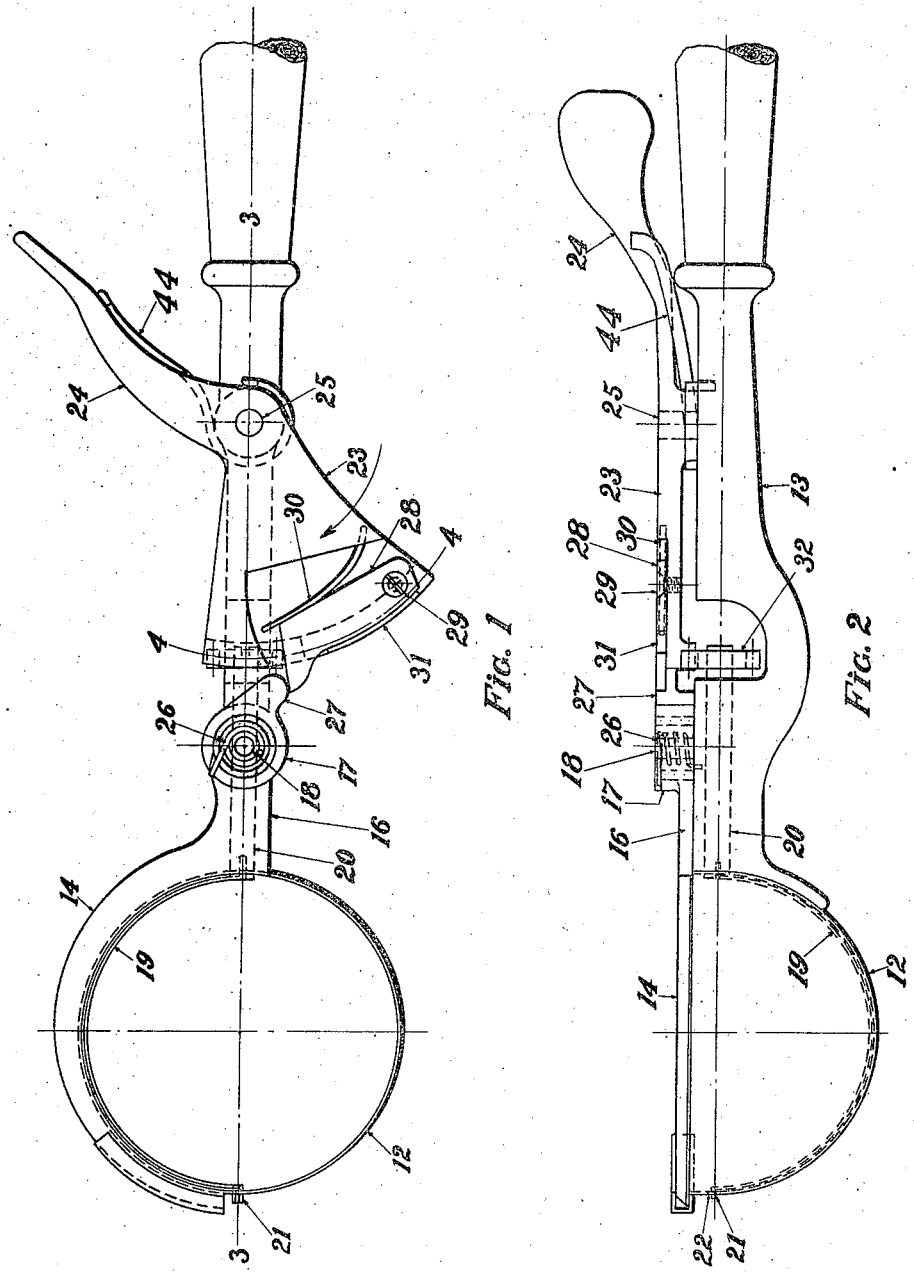

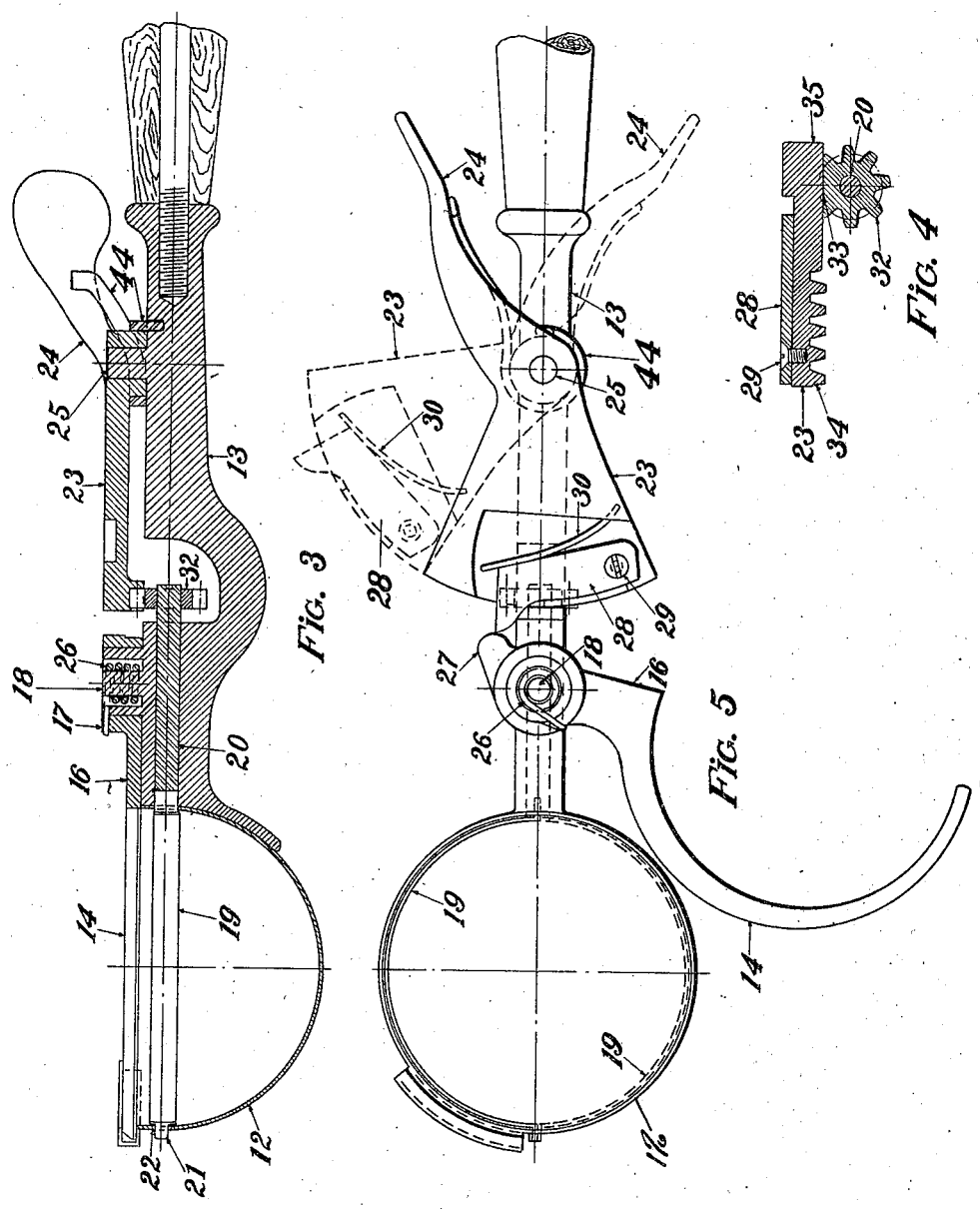

WITNESSES
Paul J. St. Jean.

INVENTORS
George Ennis Holmes
Frank W. Grant

Patented Feb. 19, 1924.

1,483,938

UNITED STATES PATENT OFFICE.

GEORGE E. HOLMES AND FRANK W. GRANT, OF DOVER, NEW HAMPSHIRE.

MEASURING ICE-CREAM DISHER.

Application filed November 13, 1922. Serial No. 600,641.

*To all whom it may concern:*

Be it known that we, GEORGE E. HOLMES and FRANK W. GRANT, citizens of the United States, residing at Dover, in the county of Strafford and State of New Hampshire, have invented new and useful Improvements in Measuring Ice-Cream Dishers, of which the following is a specification.

This invention relates to an ice-cream dispensing implement of the character set forth in Letters Patent of the United States, granted to us June 27, 1916, No. 1,188,757, wherein is disclosed a dishing bowl having a handle, a sickle-shaped cleaver blade, conforming to the top edge of the bowl, and adapted to be moved across the bowl and remove surplus material from a charge therein, and a scraper within, and conforming to the internal surface of the bowl, and adapted to loosen the charge after the operation of the cleaver blade.

The operating mechanism of our patented implement includes two manually operable levers which are moved successively by the operator to first operate the blade, and then the scraper.

The present invention has for its object to simplify the construction and operation of the implement by providing operating mechanism including a single operating lever, adapted to first operate, and then release the cleaver blade during the initial movement of the lever from its starting position, and to subsequently first operate, and then release the scraper during the final movement of the lever from its starting position, so that the blade and scraper are caused to perform their functions by one movement of a single operating lever.

We attain this object by the means hereinafter described and claimed.

Of the accompanying drawings forming a part of this specification,—

Figure 1 is a top plan view of a disher embodying the invention.

Figure 2 is a side view of the same.

Figure 3 is a section on line 3—3 of Figure 1.

Figure 4 is a section on line 4—4 of Figure 1.

Figure 5 is a view similar to Figure 1, illustrating the operation by full and dotted lines.

Figure 7:
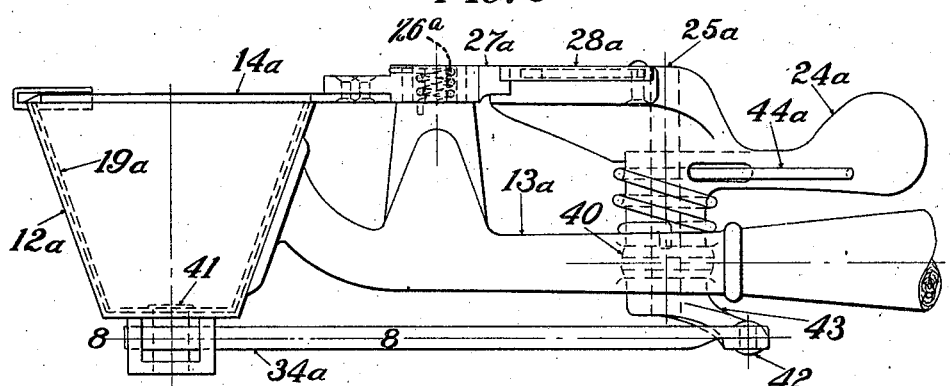

Figure 7 a side view, showing a different embodiment.

Figure 8:
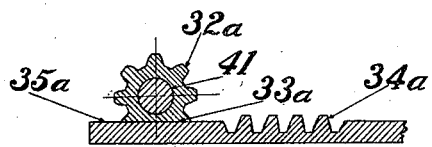

Figure 8 is a section on line 8—8 of Figure 7.

The same reference characters indicate the same parts in all the figures.

Referring first to Figures 1, 2, 3 and 4, 12 represents a hemispherical bowl having a handle 13. Movable across, and conforming to the top edge of the bowl, is a sickle-shaped cleaver blade 14, which is movable across the bowl to sever surplus material from a charge of ice cream collected therein. The blade has a shank 16, having a hub portion 17, pivotally connected with the handle 13 by a stud 18. Journaled to turn within the bowl is a bail-shaped scraper 19, which conforms to the internal surface of the bowl and is movable over said surface to loosen a charge in the bowl. In this embodiment of the invention, one end of the scraper is fixed to a shaft 20, which is journaled in a bearing in the handle 13, the opposite end of the scraper being provided with a trunnion 21, adapted to rotate in a bearing orifice 22 in one side of the bowl.

23 and 24 represent the arms of a single two-armed lever which is fulcrumed on the handle 13 by means of a stud 25. 44 represents a lever-controlling spring, one end of which is fastened in the handle 13. The other end bears against the lever arm 24, and returns the lever after operation to its starting position, and through the torque-transmitting connections, returns the scraper 19 to its starting position. We provide trigger means carried by the hub 17 of the blade shank, and by the lever arm 23, adapted to first operate the blade by swinging it across the bowl from the starting position shown by Figure 1, and then release the blade and permit its return to said position by a blade controlling spring 26, which is connected with the hub and the handle, and normally holds the blade in its starting position. We preferably embody said trigger means in an ear 27, fixed to the hub 17, and a dog 28, pivoted at 29 to the lever arm 23, and normally held by a spring 30 in position to engage the ear 27, as shown by Figure 1, the lever arm being provided with a stop 31 against which the dog is pressed by the spring 30. When the lever arm 23 is moved from its normal position, in the direction of the arrow (Figure 1,) the dog engages the ear 27, swings the blade 14 across the bowl, thus operating the blade, and then passes across the ear, thus releasing the blade and permitting its return to its starting position by the controlling spring 26. The arrangement of the dog and the ear is such that the blade is operated and released during the first or initial movement of the lever from its starting position, the blade being released when the lever has completed about one-half of its entire movement from its starting position, as indicated by full lines in Figure 5, so that the lever has a final movement to the position indicated by dotted lines (Figure 5), this movement being sufficient to operate the scraper after the operation and release of the blade.

We provide torque-transmitting connections between the lever arm 23 and the scraper. Said connections include the shaft 20, an incomplete gear or pinion 32, fixed to the shaft, and a curved rack 34, formed on or fixed to the lever arm 23. The pinion 32 is provided with a stop portion 33 (Figure 4), and the rack is provided with a complemental stop portion 35, said stop portions cooperating with each other in preventing rotation of the pinion while the lever arm is operating the cleaver blade. When the cleaver blade is released, the teeth of the rack engage those of the pinion during the final movement of the lever from its starting position, and operate the scraper by imparting a half rotation thereto, the scraper being thus moved from one side of the top edge of the bowl to the opposite side. When the lever is released and returned to its starting position by the controlling spring 44, the scraper is returned to its starting position by the spring 44 through the lever and the described torque-transmitting connections.

It will now be seen that when the operator presses the lever arm 24 to move the lever from its starting position, the initial movement of the lever to the position shown by full lines by Figure 5, first operates, and then releases the cleaver blade 14, and the final movement of the lever from said position, to the position indicated by dotted lines (Figure 5), operates the scraper, the scraper and the lever being simultaneously returned to their starting positions by the spring 44, when the lever is released by the operator. The blade and the scraper are therefore successively operated by a unidirectional movement of a single operating lever.

Figure 6:
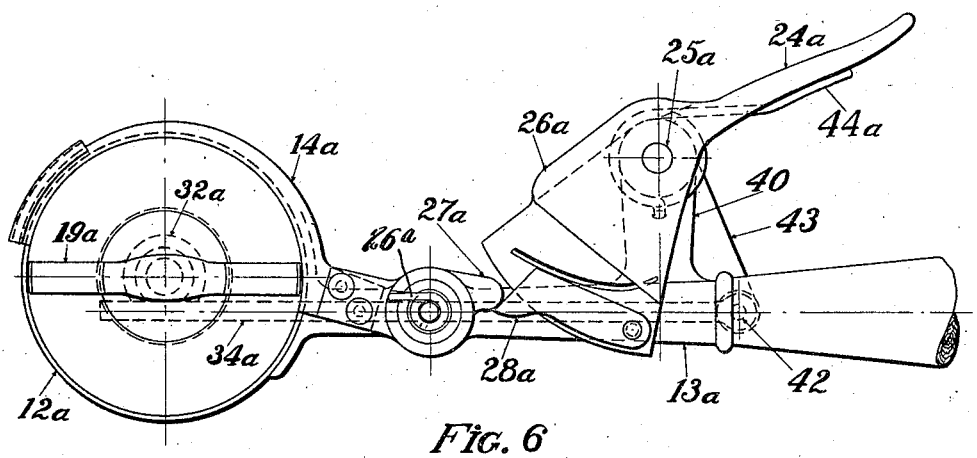
Figure 6 is a top plan view.

In the embodiment of the invention shown by Figures 6, 7 and 8, the cleaver blade 14ª, the lever-controlling spring 26ª, the operating lever composed of arms 23ª and 24ª, the blade-controlling spring 44ª, and the trigger mechanism, composed of the ear 27ª and dog 28ª, are constructed and adapted to operate as above described, the stud 25ª on which the lever is fulcrumed, being preferably fixed to an arm 40, on the bowl handle 13ª. The bowl 12ª is of frusto-conical shape, and has a flat bottom, having a bearing in which is journaled a stud 41.

The scraper 19ª is formed as shown by dotted lines in Figure 7, and is fixed to the stud 41. An incomplete gear 32ª having a stop portion 33ª, is fixed to the stud 41, and cooperates with a rack 34ª, having a stop portion 35ª. The rack is pivotally connected at one end by a pin 42, with an arm 43 fixed or formed on to the operating lever.

The arrangement is such that the scraper is operated as before, during the final movement of the operating lever, from its starting position.

We claim:

1. A measuring ice-cream disher comprising, in combination, a bowl having a handle, a sickle-shaped cleaver blade, conforming to the top edge of the bowl, and provided with a shank pivoted to the handle, a scraper journaled to turn within the bowl, and conforming to the internal surface of the latter, a single manually movable operating lever, fulcrumed on the handle, blade-operating and releasing trigger means, carried by the blade shank and the lever, and adapted to alternately operate and release the blade, torque-transmitting connections between the lever and the scraper, a controlling spring acting directly on the blade to normally hold the blade in its starting position, and another controlling spring, acting directly on the lever, to normally hold the lever in its starting position, the lever acting through said trigger means, to operatively move the blade across the bowl, and the lever spring acting indirectly on the scraper through said connections, to hold the scraper in its starting position, the arrangement being such that the initial movement of the lever from its starting position, first operates, and then releases the blade, and the final movement of the lever from said position, operates the scraper after the operation and release of the blade.

2. A measuring ice-cream disher substantially as specified by claim 1, the said trigger means being embodied in an ear carried by the blade shank, and a spring-pressed ear-engaging dog pivoted to the lever and adapted to operate the blade during the initial movement of the lever, and to release the blade before the final movement of the lever.

3. A measuring ice-cream disher substantially as specified by claim 1, the said torque-transmitting connections including a rack, movable by the lever and provided with a stop portion, and a pinion rigidly connected with the scraper, and provided with a complemental stop portion, said stop portions being arranged to prevent rotation of the scraper during the initial movement of the lever, and to cause such rotation during the final movement of the lever.

4. A measuring ice-cream disher comprising, in combination, a bowl having a handle, a sickle-shaped cleaver blade, conforming to the top edge of the bowl, and provided with a shank pivoted to the handle, a scraper conforming to the internal surface of the bowl, and provided with a shaft, journaled in a bearing in the handle, an incomplete pinion fixed to the shaft and provided with a stop portion, a single manually movable operating lever fulcrumed on the handle, blade-operating and releasing means including an ear fixed to the blade shank, and a spring-pressed dog pivoted to the lever, a curved rack fixed to the lever, and provided with a stop portion, adapted to cooperate with the stop portion of the pinion in first preventing, and then permitting rotation of the pinion and scraper by the lever, a controlling spring acting directly on the blade, to normally hold the blade in its starting position, and another controlling spring acting directly on the lever, to normally hold the lever in its starting position, the lever acting on the blade through said blade-operating and releasing means, to operatively move the blade across the bowl, the lever spring acting indirectly on the scraper through said lever, rack, pinion, and shaft, to normally hold the scraper in its starting position, the arrangement being such that the initial movement of the lever from its starting position first operates, and then releases the blade, and the final movement of the lever from said position operates the scraper after the operation and release of the blade.

5. A measuring ice-cream disher comprising, in combination, a bowl having a handle, a sickle-shaped cleaver blade, conforming to the top edge of the bowl, and having a shank pivoted to the handle, a scraper journaled within, and conforming to the internal surface of the bowl, and mechanism normally holding the blade and the scraper in their starting positions, and operable to operate the blade and the scraper successively, said mechanism comprising controlling springs, a manually movable lever fulcrumed on the handle, and connections between the springs, the blade, the scraper, and the lever, whereby said parts are normally held in their starting positions by the springs, the arrangement being such that the initial manual movement of the lever from its starting position first operates, and then releases the blade without operation of the scraper, and the final manual movement of the lever first operates the scraper, after the return of the blade to its starting position.

6. A measuring ice-cream disher comprising, in combination, a bowl having a handle, a sickle-shaped cleaver blade, conforming to the top edge of the bowl, and having a shank pivoted to the handle, a scraper journaled within, and conforming to the internal surface of the bowl, and manually operable mechanism for successively operating the blade and the scraper, said mechanism including a manually movable lever fulcrumed on the handle, a controlling spring directly connected with the blade shank, to normally hold the blade in its starting position, another controlling spring acting directly on the lever, to normally hold the lever in its starting position, cooperating members carried by the blade shank and the lever, and adapted to transmit motion from the lever to the blade, to first operate, and then release the blade during the initial movement of the lever from its starting position, and connections between the lever and the scraper, organized to operate the scraper during the final movement of the lever.

In testimony whereof we have affixed our signatures.

GEORGE E. HOLMES.
FRANK W. GRANT.